United States Patent [19]

Johnson et al.

[11] Patent Number: 5,309,514
[45] Date of Patent: May 3, 1994

[54] PULSE GENERATOR INCLUDING A MEMORY FOR STORING PULSES FOR MODULATION ON A CARRIER OF A TELEVISION SIGNAL

[75] Inventors: Marshall B. Johnson, Norcross; Lamar E. West, Jr., Maysville, both of Ga.

[73] Assignee: Scientific-Atlanta, Inc., Atlanta, Ga.

[21] Appl. No.: 891,053

[22] Filed: Jun. 1, 1992

[51] Int. Cl.$^5$ .............................................. H04N 7/167
[52] U.S. Cl. .................................... 380/10; 380/12; 328/59
[58] Field of Search .................. 380/10, 12, 13, 20, 380/221; 455/317; 382/43; 328/59; 364/726, 827; 358/142, 143, 146, 36

[56] References Cited

U.S. PATENT DOCUMENTS

| | | | |
|---|---|---|---|
| 4,257,108 | 3/1981 | Igel | 328/59 X |
| 4,466,017 | 8/1984 | Banker | 380/15 |
| 4,471,380 | 9/1984 | Mobley | 380/15 X |
| 4,523,228 | 6/1985 | Banker | 380/15 X |
| 4,821,097 | 4/1989 | Robbins | 380/10 X |
| 4,839,922 | 6/1989 | Imasaki et al. | 380/20 X |
| 4,924,498 | 5/1990 | Farmer et al. | 380/15 X |
| 5,058,160 | 10/1991 | Banker et al. | 380/20 |
| 5,142,574 | 8/1992 | West, Jr. et al. | 380/20 X |

Primary Examiner—Tod R. Swann
Attorney, Agent, or Firm—Banner, Birch, McKie Beckett

[57] ABSTRACT

A pulse generator for generating pulses for modulation onto a carrier or subcarrier of a composite television signal is provided. The pulse generator includes a memory such as an EPROM for storing one or more waveshapes. Each stored waveshape is defined by a sequence of addressable values representing the amplitude of the waveshape as a function of time. A selecting circuit such as a microprocessor selects one of the waveshapes in the memory. A counting circuit responsive to a clock signal controls the address lines of the memory to read the amplitude values corresponding to the selected waveshape from the memory. The amplitude values are supplied to a digital to analog converter to convert the amplitude values to an analog pulse. The pulse may then be filtered to remove clock noise. The resultant signal is supplied to an amplitude modulator for modulating the signal onto a carrier or subcarrier of a composite television signal.

8 Claims, 14 Drawing Sheets

| ADDRESS | AMPLITUDE |
|---------|-----------|
| 00000000 | 00001101 |
| 00000001 | 00001110 |
| 00000010 | 00001111 |
| ⋮ | ⋮ |
| 11111111 | 00001101 |

| | CHARACTERISTIC | PAL I SPECIFICATION | PAL B&G SPECIFICATION |
|---|---|---|---|
| 1 | CHANNEL SPACING | 8 MHz | 7/8 MHz |
| 2 | LINES PER PICTURE | 625 | 625 |
| | HORIZONTAL LINE FREQUENCY | 15625 Hz | 15625 Hz |
| | LINE PERIOD | 64 uSec | 64 uSec |
| | FIELD RATE | 50 Fields/Sec | 50 Fields/Sec |
| | FIELD PERIOD | 20 MSec | 20 MSec |
| 3 | VIDEO BANDWIDTH | 5.5 MHz | 5.0 MHz |
| 4 | CHROMINANCE SUB-CARRIER | 4.43 MHz CENTER FREQUENCY | 4.43 MHz CENTER FREQUENCY |
| | CHROMINANCE BAND WIDTH | +1.07 MHz,-1.3 MHz | +.57 MHz,-1.3 MHz |
| 5 | VESTIGAL SIDEBAND | .75 MHz | .75 MHz |
| 6 | MONO-SOUND SUB-CARRIER | 6.0 MHz,-15 dBc | 5.5 MHz,-15 dBc |
| | MODULATION | +/- 50 KHz FM, 50 uSec PRE-EMPHASIS | +/-50 KHz FM, 50 uSec PRE-EMPHASIS |
| 7 | NICAM SOUND SUB-CARRIER | 6.552 MHz,-24 OR -25 dBc | 5.85 MHz,-24 OR -25 dBc |
| | DATA SHAPING FILTER | 100% COSINE ROLLOFF | 40% COSINE ROLLOFF |
| | SUB-CARRIER BANDWIDTH | +/- 364 kHz,Fc=6.552 MHz | +/- 254.8 kHz,Fc=5.85 MHz |
| 8 | TELETEXT PULSE WIDTH | 144 nSec | 144 nSec |
| | BANDWIDTH | 3.5 MHz | 3.5 MHz |
| 9 | DUAL SOUND FM | NONE | Fs1:5.5 MHz+/-500 Hz |
| | | | Fs2:5.7421875 MHz+/-500 Hz |

FIG. 12

PULSE GENERATOR INCLUDING A MEMORY FOR STORING PULSES FOR MODULATION ON A CARRIER OF A TELEVISION SIGNAL

BACKGROUND OF THE INVENTION

1. Technical Field

The present invention generally relates to a method and apparatus of transmitting information in a television system and, more particularly, to a pulse generator including a memory for storing pulses for modulation onto a carrier or subcarrier of a composite television signal.

2. Description of the Prior Art

In conventional cable television systems, information may be transmitted from a headend location to individual terminal units in the system. This information provides a variety of information, for example, describing how a composite video signal is being scrambled, as well as other information useful to the terminal unit as is well-known in the art. Ways of transmitting such information include amplitude modulating the FM sound carrier, a subcarrier, or an out-of-band carrier signal with the information.

FIG. 1 illustrates adjacent NTSC television channels. Each television channel has a bandwidth of 6 MHz, within which a composite video and audio signal are transmitted. The video portion is transmitted as signals amplitude modulating a picture carrier and occupying 5.5 MHz of the channel, while the audio portion is transmitted in a 50 KHz band as a frequency modulated signal on a sound carrier 4.5 MHz above the picture carrier frequency. A color subcarrier is located 3.58 MHz above the video carrier. The sound carrier of the first channel is centered 0.25 MHz below the upper end of the second channel. It is important to ensure that when information is amplitude modulated onto the sound carrier of the first channel, interference with the second channel is not generated. The transmission of information by amplitude modulating a square wave pulse with its sharp transitions is desirable in terms of detection by a receiver. However, when the sound carrier of the first channel is amplitude modulated using the square wave pulses illustrated in FIG. 2A, the resulting spectrum 25 can be seen to interfere with the second channel. Wave shaping techniques may be used to reduce this interference. For example, the spectrum 30 generated by amplitude modulating the audio subcarrier of the first channel with the sine squared pulses illustrated in FIG. 2B does not significantly interfere with the second channel.

A circuit arrangement for amplitude modulating the sound carrier using the sine squared pulses of FIG. 2B is illustrated in FIG. 3A. The circuit arrangement includes a control circuit 40, a logic gate 45, a sine squared shaping filter 50, and an amplitude modulator 55. Control circuit 40 such as a microprocessor applies control signals to logic gate 45, such as a TTL gate, in accordance with the data to be transmitted. Logic gate 45 outputs square wave pulses in response to the control signals, one such pulse designated as 47. Square wave pulse 47 is supplied to sine squared shaping filter 50, such as a fourth order sine squared shaping filter, which shapes pulse 47 to a sine squared pulse 52. Sine squared pulse 52 has a sufficiently sharp transition to permit detection by receivers, but avoids the interference problems associated with rectangular pulses. Sine squared pulse 52 is supplied to audio modulator 55 which amplitude modulates the sine squared pulse onto an intermediate frequency sound carrier. The output of audio modulator 55 is supplied to a modulator (not shown) for generating a television signal suitable for transmission, for example, over a cable television system. A terminal unit in the cable television system receives the television signal and recovers the information amplitude modulated onto the sound carrier in order, for example, to descramble scrambled video information.

The amplitude modulation of pulses onto the sound carrier may also be used in an effort to defeat the ability of unauthorized or pirate terminal units from recovering the transmitted descrambling information to thereby obtain access to premium programming. Accordingly, pulses may be transmitted which unauthorized terminal units incorrectly detect as descrambling information, but which authorized terminal units ignore. This may be accomplished, for example, by transmitting pulses 40 and 42 as illustrated in FIG. 2C. Unauthorized terminal units may detect pulses 40 and 42 as timing pulses, thereby inhibiting the ability of the unauthorized terminal unit to recover the proper timing information necessary to descramble the scrambled picture. Authorized terminal units would ignore pulses 40 and 42. It will be appreciated that compatibility among various systems sensitive to data amplitude modulated on the sound carrier may be achieved if, for example, certain pulses modulated onto the sound carrier by a scrambler of a first system are not detected by receivers designed for use in a second system. Again referring to FIG. 2C, a scrambler designed to transmit data to a receiver of a first system may nonetheless be compatible with receivers of a second system if, for example, pulses 40 and 42 have an amplitude sufficient to be detected by receivers of the first system, but not by receivers of the second system.

Pulses such as those in FIG. 2C may be generated by the circuitry of FIG. 3B which includes control circuit 66, logic gate 67, pulse modification circuit 68, first and second sine squared shaping filters 70 and 72, timing control 75, gain adjustment circuit 80, and amplitude modulator 81. Control circuit 66 applies control signals to logic gate 67 in accordance with the data to be transmitted. Logic gate 67 outputs square wave pulses in response to the control signals. Pulse modification circuit 68 may be included to shift the level of the square wave since pulses of different amplitudes are to be generated. First and second sine squared shaping filters 70 and 72 shape the pulses. Gain adjusting circuitry 80 is utilized to adjust the gain of the signal in one path relative to the signal in the other path. Timing control 75 switches between the outputs of filters 70 and 72 at appropriate times. Amplitude modulator 81 modulates the pulses onto a sound carrier at an intermediate frequency. While such circuitry may be implemented, the timing control may be difficult to implement in practice and the sine squared filters must be specifically designed to defeat each different pirating technique or to achieve compatibility with each different system.

The amplitude modulation of signals on the sound carrier at the line rate of 15.734 KHz ($f_H$) can also interfere with the second audio program (SAP) of a stereo transmission. The second audio program is modulated onto a subcarrier having a frequency five times the line rate $f_H$. If a high quality demodulator is not utilized, AM to FM conversion of the energy modulated onto the audio subcarrier at the line rate $f_H$ can result in the false detection of a second audio program or, more likely, a distortion of the second audio program. This problem may be addressed, for example, by providing a notch filter in the receiver to remove the fifth harmonic of the signal modulating the sound carrier at the line rate. However, such an arrangement can be difficult to implement and further adds group delay to the filtered signal.

SUMMARY OF THE INVENTION

Accordingly, it is an object of the present invention to provide a method and apparatus for generating pulses for amplitude modulating a carrier of a television distribution system such as a sound carrier which reduce interference with other portions of the television signal.

It is another object of the present invention to provide a method and apparatus for generating pulses for amplitude modulating a carrier of a television distribution system such as a sound carrier with pulses having different wave shapes without the need for complicated circuitry.

It is a further object of the present invention to provide a method and apparatus for generating pulses for amplitude modulating a carrier of a television distribution system which reduces the effect of noise on the detection of the pulses.

It is a further object of the present invention to provide a method and apparatus for generating pulses for amplitude modulating a carrier of a television distribution system which precompensates for filtering of the carrier.

In accordance with the present invention, one or more waveshapes are stored in a memory such as an EPROM. Each stored waveshape is defined by a sequence of addressable values representing the amplitude of the waveshape as a function of time. A selecting circuit such as a microprocessor selects one of the waveshapes in the memory. A counting circuit responsive to a clock signal controls the address lines of the memory to read the amplitude values corresponding to the selected waveshape from the memory. The amplitude values are supplied to a digital to analog converter to convert the amplitude values to an analog pulse. The pulse may be filtered to remove clock noise. The resultant signal is supplied to an amplitude modulator for modulating the signal onto a carrier or subcarrier of a composite television signal.

Also in accordance with the present invention, a method for generating pulses for modulation onto a carrier signal of a television signal distribution system is disclosed. The method includes the step of storing one or more waveshapes defined as sequence of addressable values representing the amplitude of the waveshape as a function of time. One of the waveshapes is then selected from the memory. Next, address signals are generated for sequentially reading the amplitude values corresponding to the selected waveshape from the memory. The amplitude values are then sequentially read from the memory to an analog pulse for modulation onto the carrier.

Accordingly, multiple waveshapes of different widths and slopes may be stored in memory and read out as desired for amplitude modulation onto the sound carrier, while avoiding the need for a variety of analog filters and timing circuits. Additionally, waveshapes may be represented in the frequency domain through Fourier analysis. It is thus possible to alter the amplitude and phase of one or more harmonics of a given waveshape. This permits control of the contribution of energy at the various harmonics of the waveshape. For example, by removing the fifth harmonic of a timing pulse which is modulated onto the sound carrier at the line frequency $f_H$, it is possible to reduce the contribution of energy by this harmonic to the second audio program in an NTSC system.

BRIEF DESCRIPTION OF THE DRAWINGS

The foregoing and other objects, features, and advantages of the present invention, as well as presently preferred embodiments thereof and the best modes now known for practicing the invention, will become more apparent from a reading of the following description in connection with the accompanying drawings, in which:

FIG. 12 is table setting forth the specifications of PAL I and PAL B&G systems;

DETAILED DESCRIPTION OF THE PREFERRED EMBODIMENT

The present invention will be generally discussed with reference to FIGS. 4–6.

Figures 4, 5:
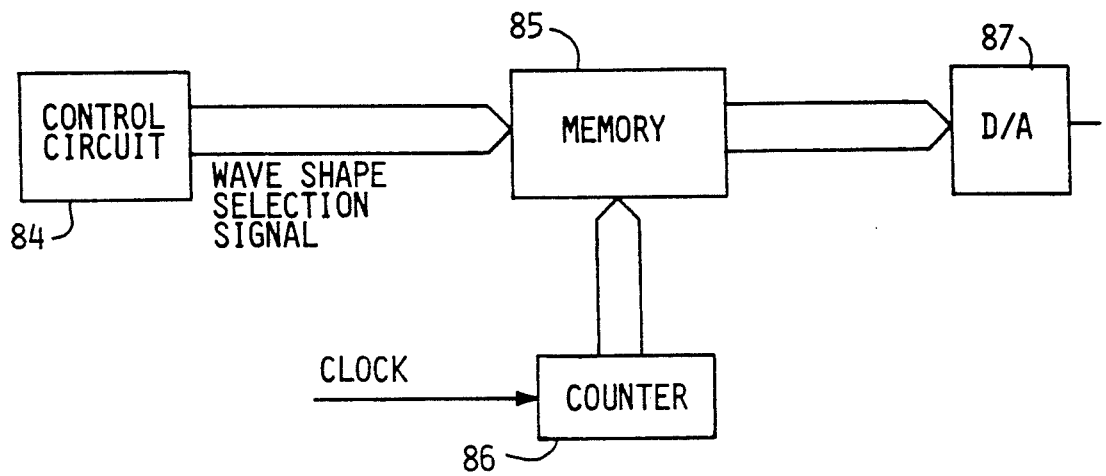
FIG. 4 is a general block diagram of a pulse generator in accordance with present invention.
FIG. 5 is a diagram illustrating the manner in which amplitude values of waveshapes are stored in memory.

Referring to FIG. 4, in accordance with the present invention, desired waveshapes for modulating a carrier or subcarrier of a composite television signal are stored in a memory 85 such as an EPROM. In a preferred embodiment, waveshapes are stored for modulating the sound carrier of a composite NTSC television signal in a cable television system, although the invention is not limited in this respect. It will be apparent that the present invention may be applied to PAL or SECAM systems. Each stored waveshape is defined by a sequence of addressable values representing the amplitude of the waveshape as a function of time. For example, with reference to FIG. 5, memory address 00000000 stores an amplitude represented by the value 00001101. The amplitude value 00001101 is utilized as a baseline in order to allow for waveshapes having harmonics removed as discussed in greater detail below. Memory address 00000001 stores an amplitude represented by the value 00001110, etc. In a preferred embodiment, the amplitude values of each waveshape are respectively stored in 256 addressable memory locations and the amplitude values range from 00000000 to 11111111. Waveshapes preferably start and stop at the same amplitude, such as the baseline amplitude, in order to facilitate transitions from one waveshape to another. Particular waveshapes stored in the memory are selected via a waveshape select signal generated by a control circuit 84 such as a microprocessor. A counter 86 responsive to a system clock signal then increments through the memory addresses storing the amplitude values of the selected waveshape. The digital values output from the memory are supplied to a digital to an analog (D/A) converter 87 which generates an analog signal corresponding to the information read out from the memory.

Figure 6A:
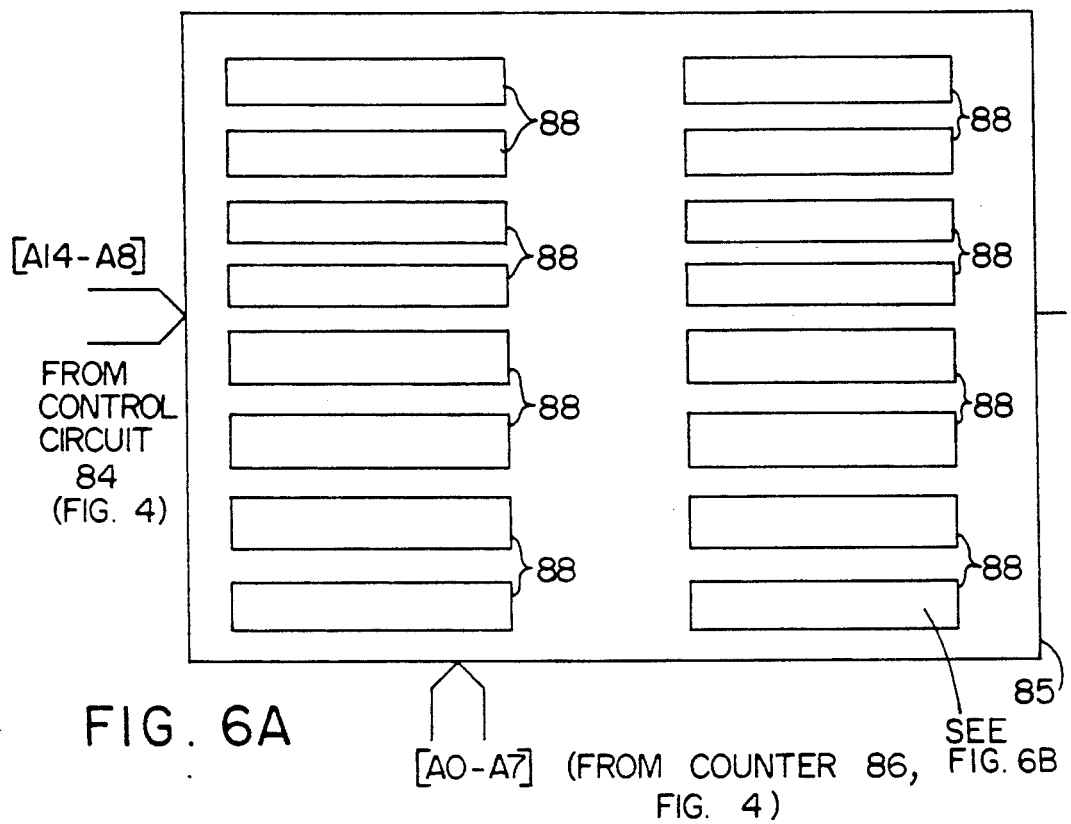
FIGS 6A and 6B illustrate a manner in which waveshapes may be stored in memory.
Figure 6B:
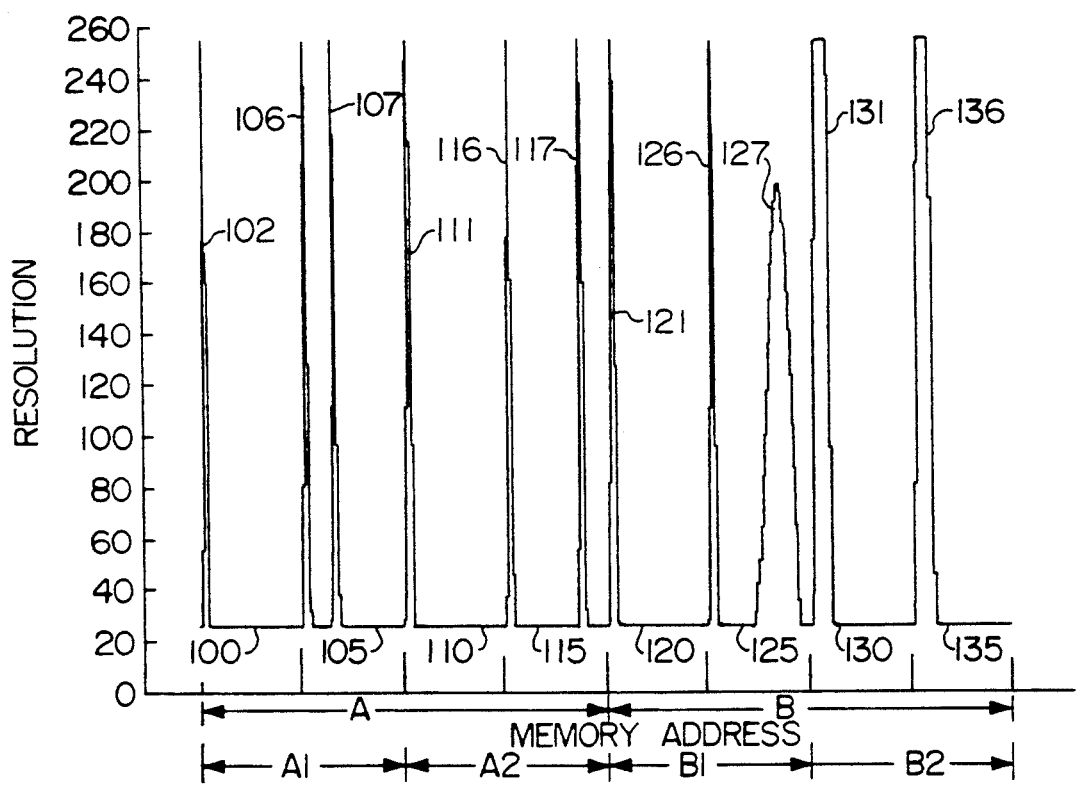

In a preferred configuration, banks of eight waveshapes are stored in memory as illustrated in FIG. 6. In a given system, a single bank 88 of eight waveshapes may satisfy the requirements of a scrambler for a particular channel. However, as discussed below, a single scrambler may access a plurality of banks of waveshapes. Selection of particular waveshapes is accomplished by addressing the memory as discussed in detail below. In a current embodiment, the memory includes two blocks each having eight banks of waveshapes. Each bank 88 consists of eight waveshapes. Thus, up to 128 waveshapes may be stored in memory. Seven address lines denoted herein by A8, A9, A10, A11, A12, A13, and A14 are controlled to permit selection of any one of the 128 waveshapes. The combination of these signals constitutes the waveshape select signal. One of the two blocks is selected by controlling address line A14. One bank of the eight banks within a selected block is selected by controlling address lines A11, A12, and A13. One waveshape of the eight waveshapes within the selected bank is selected by controlling address lines A8, A9, and A10.

One bank of waveshapes is shown in exploded view in FIG. 6. Waveshape 100 includes a pulse 102 which may be a timing pulse. Waveshape 105 includes a pulse 106 which may be a timing pulse and a pulse 107 which may be a data pulse. Waveshape 110 includes a pulse 111 which may be a timing pulse. Waveshape 115 includes a pulse 116 which may be a timing pulse and a pulse 117 which may be a data pulse. The data pulse of waveshape 115 is spaced from the corresponding timing pulse by a different spacing than the spacing between the timing pulse and data pulse of waveshape 100. Waveshape 120 includes a pulse 121 which may be a timing pulse. Waveshape 125 includes a pulse 126 which may be a timing pulse and a pulse 127 which may be a data pulse. The data pulse of waveshape 125 is shaped differently than the data pulses of waveshapes 105 and 115. Waveshapes 130 and 135 respectively include pulses 131 and 136 which may be timing pulses. The timing pulses of waveshapes 130 and 135 are shaped differently than the timing pulses of waveshapes 100, 105, 110, 115, 120 and 125.

Figure 1:
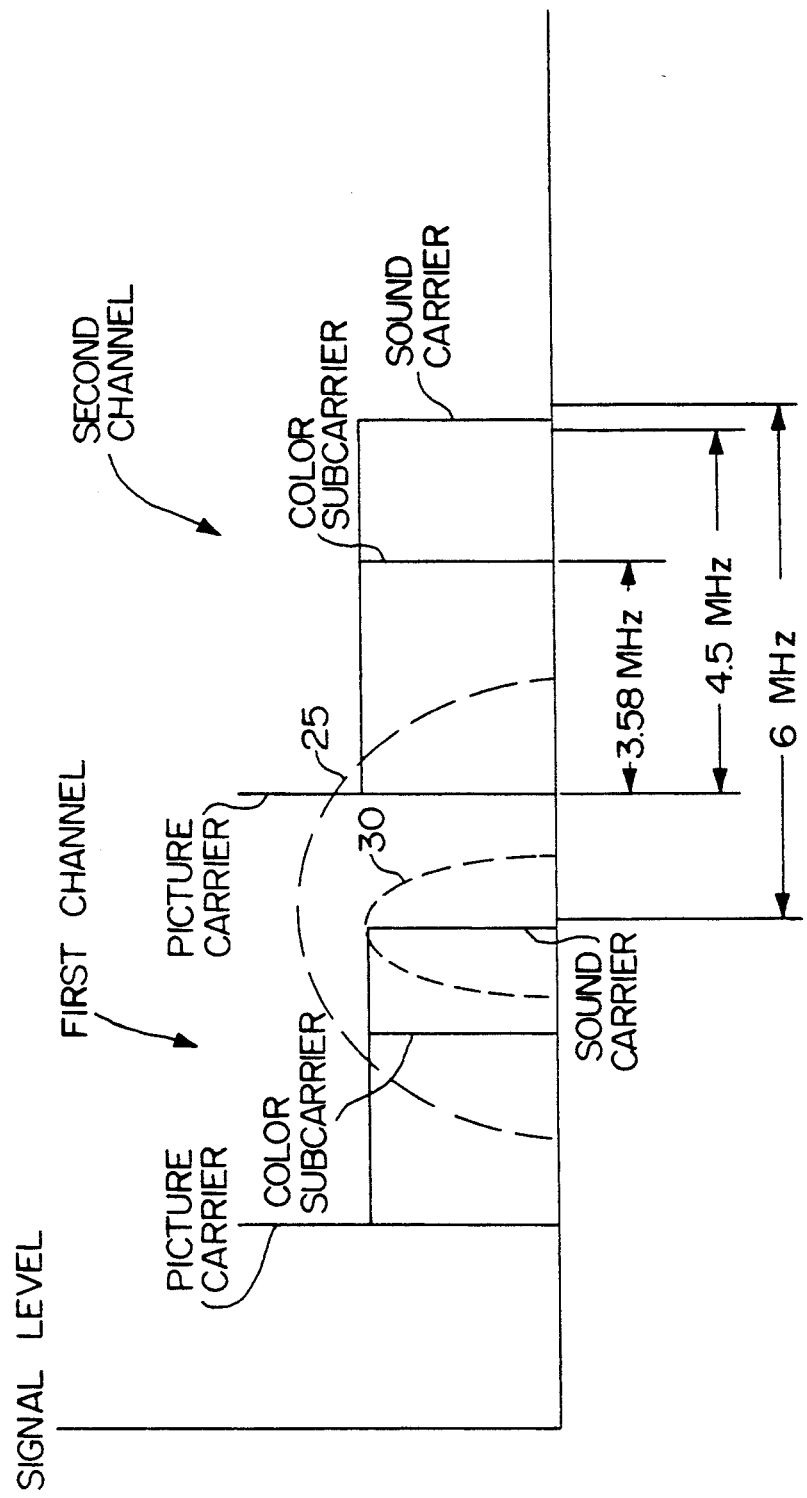
FIG. 1 depicts adjacent NTSC color television signals.
Figure 2A:
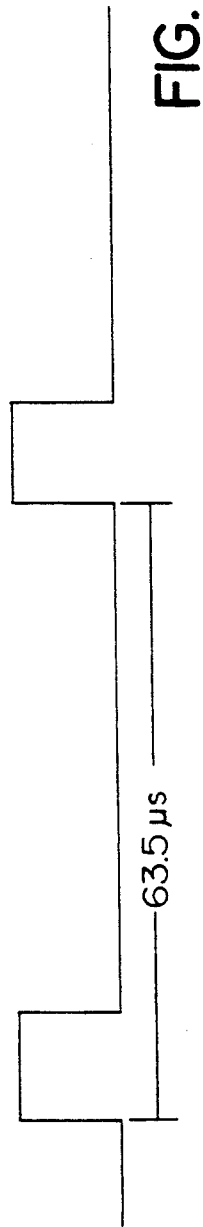
FIG. 2A, 2B, and 2C illustrates various waveshapes for modulation onto a sound carrier of a composite television signal.
Figure 2B:
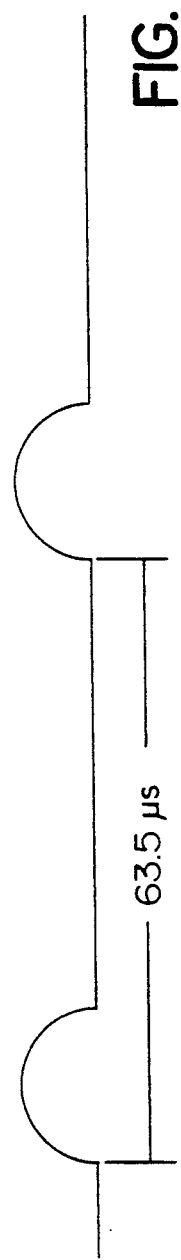
Figure 2C:
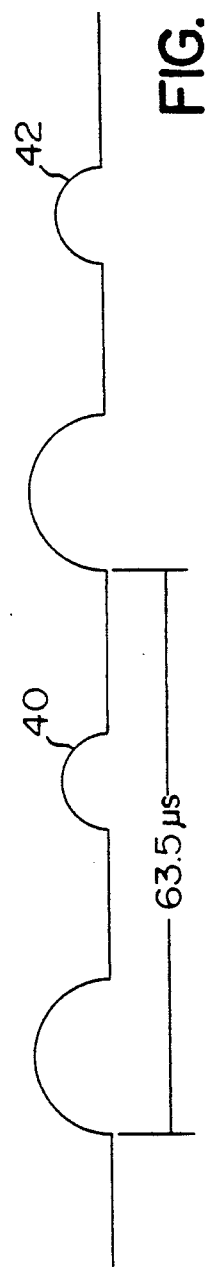
Figure 3A:
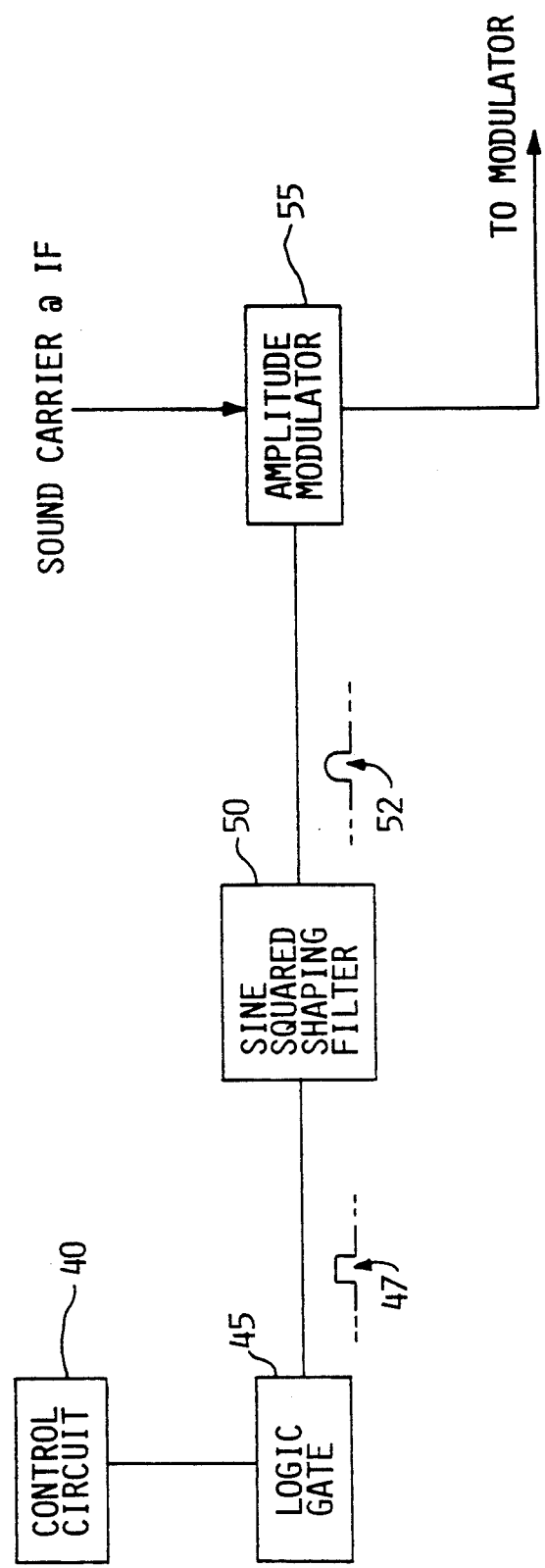
FIGS. 3A and 3B are block diagrams of circuit arrangements for generating the waveshapes of FIGS. 2B and 2C, respectively.
Figure 3B:
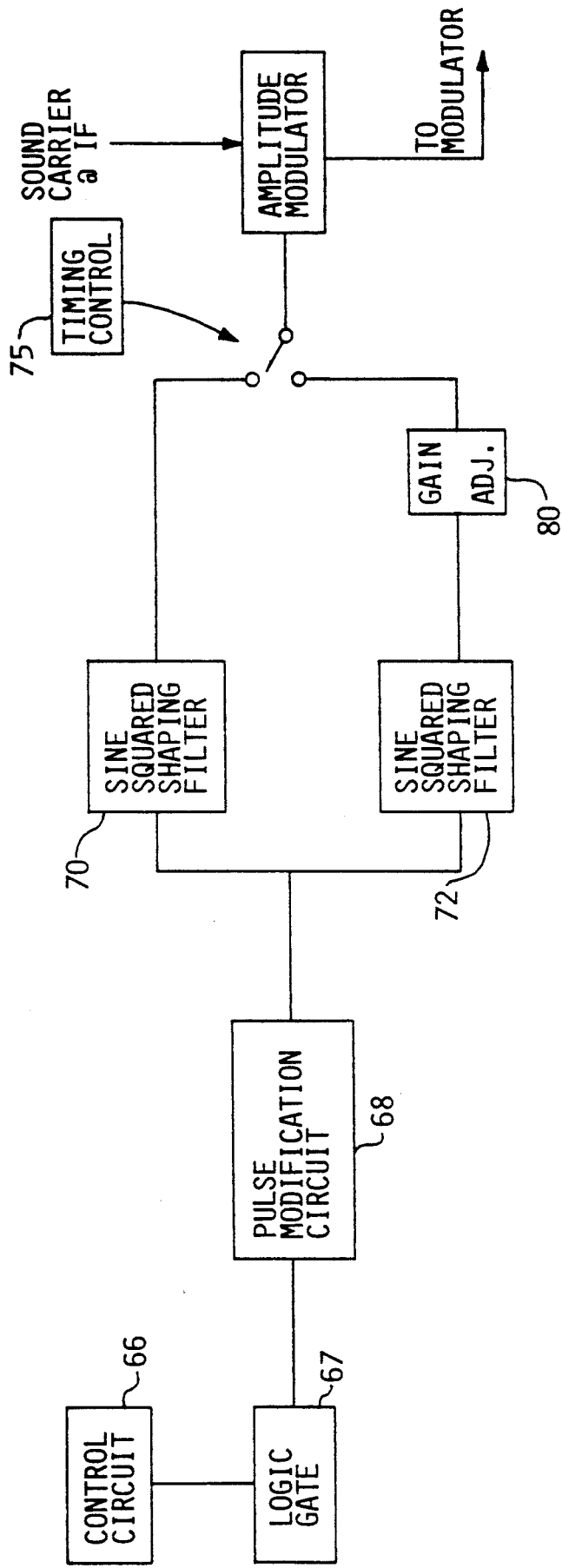

It will be apparent any suitable waveshape may be stored in memory in accordance with the manner in which it is desired to amplitude modulate the sound carrier and the manner in which pulses are detected at a receiver. For example, the waveshapes illustrated in FIG. 2C may be easily generated and stored in memory. These waveshapes may be used to amplitude modulate a carrier in a television distribution network without the need for complicated filter circuits and complicated timing control. Thus, in general, the problem of generating waveshapes including pulses having different shapes, amplitudes, and pulse widths is overcome. As discussed in greater detail below, some waveshapes are particularly advantageous.

As noted above, address lines A8, A9, and A10 are used to select one of the waveshapes 100, 105, 110, 115, 120, 125, 130, and 135. This is preferably accomplished by viewing the bank of waveshapes as being divided into first and second groups A and B and subsequently into subgroups A1, A2, B1, and B2 as shown in FIG. 6. Address line A10 selects one of the groups A and B. Address line A9 selects one subgroup of the selected group. Address line A8 selects one waveshape from the selected subgroup. Subgroups A1, A2, and B1 are characterized in that each subgroup includes a first waveshape having a timing pulse only and a second waveshape having a timing pulse and a data pulse. Accordingly, when a subgroup is selected in accordance with the signals on address lines A9 and A10, a single address line (A8) may be controlled in accordance with signals from the microprocessor to determine whether the sound carrier corresponding to a given video line is amplitude modulated with both a timing pulse and a data pulse or only a timing pulse. If it is desired to transmit data pulses having different displacements relative to the timing pulse or having a different pulse shape, address lines A9 and A10 are controlled to select a different subgroup and address line A8 may then be controlled to switch between the waveshapes in the new subgroup.

The timing pulses of subgroup B2 may be transmitted to indicate to a receiver the beginning of the vertical blanking interval, for example.

Figure 7:
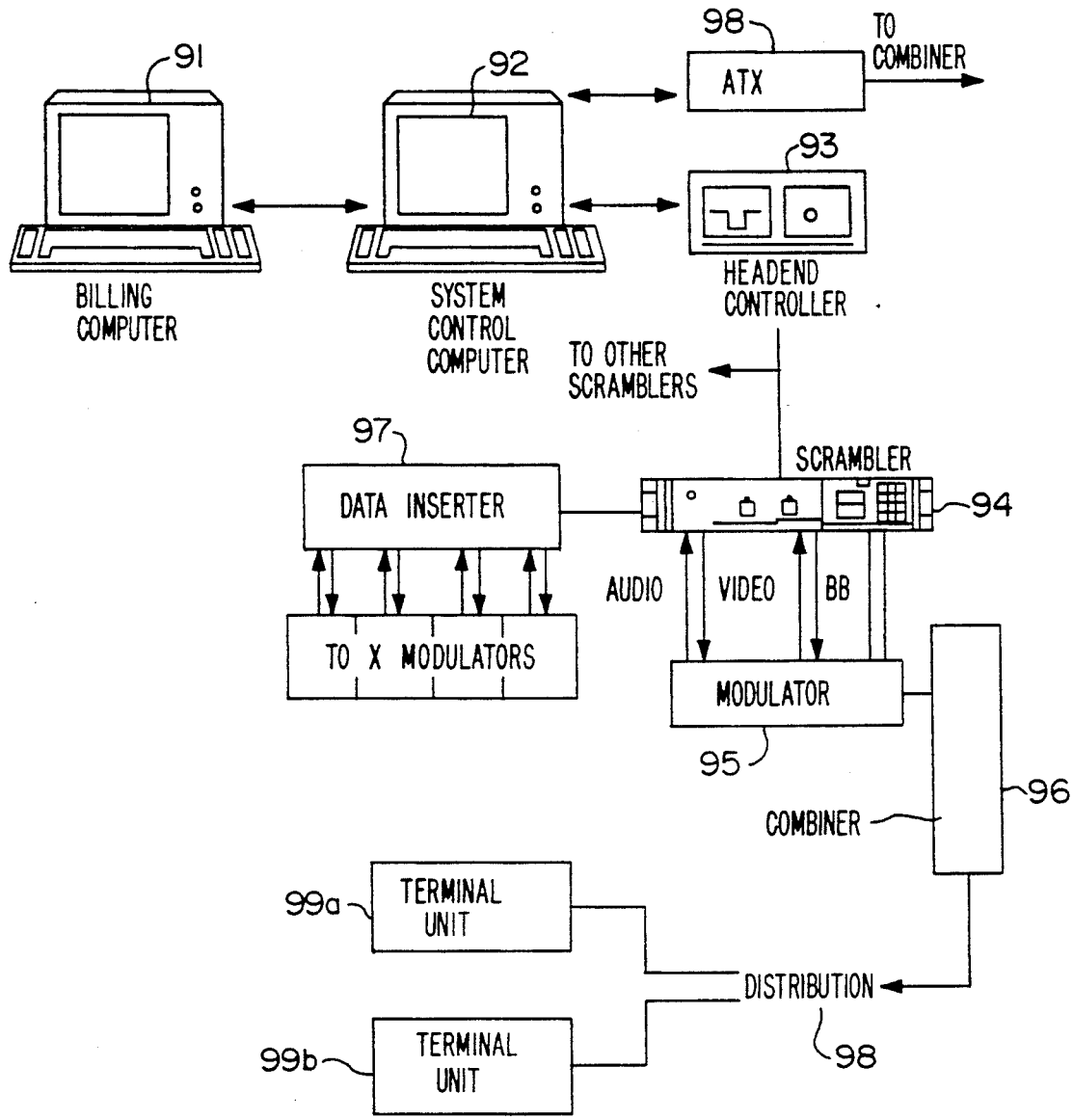
FIG. 7 is a system block diagram of a cable television system in which the present invention may be implemented.

Specific implementations of the invention will now be discussed. The present invention is suitable for use in an in-band cable system such as generally illustrated in FIG. 7 and shown, for example, in U.S. Pat. No. 5,058,160, which patent is incorporated herein by reference thereto. Billing computer 91 includes a subscriber database and generates a monthly bill for the subscribers in the system based on level of service and any additional charges such as pay-per-view purchases. System control computer 92 such as an HP-1000 is interfaced to billing computer 91. System control computer 92 receives transactions such as authorization transactions from billing computer 91 and formats and forwards transactions to headend controller 93 and addressable transmitter (ATX) 98. System control computer 92 also generates system set-up parameters such as scrambled channels and configures tuning frequencies of the channels provided to the subscribers. A system control computer interface is responsible for gathering and appropriately routing the data leaving the system control computer 92. Out-of-band data is sent to addressable transmitter 98 and in-band data is sent to headend controller 93.

Addressable transmitter 98 transmits data to out-of-band subscriber terminal units via a dedicated FM data channel such as a 108.2 megahertz data channel in the cable television distribution system. This channel, known as the data carrier, is used to transmit both addressable commands intended for a particular out-ofband subscriber terminal and global commands intended for all out-of-band subscriber terminal units in the system. Out-of-band subscriber terminal units contain a receiver that is listening to the commands sent over this data channel.

Headend controller 93 is coupled to system control computer 92 and formats system control computer transactions for scrambler 94. Headend controller 93 stores all transactions and has the ability to perform continuous refreshes. The requirement to constantly, repetitively, and efficiently transmit the information base arises since there is no permanently tuned data channel for in-band data transactions. Thus, all information flow to the in-band subscriber terminal units is subject to the indeterminate availability of a data path to the in-band subscriber terminal units.

Scrambler 94 is coupled to headend controller 93 and may be used to selectively scramble television signals for improved security in a subscription television system that is equipped with appropriate descramblers. The video, for example, may be scrambled in any manner known in the art including sync suppression and video inversion. The output of scrambler 94 is supplied to modulator 95. The output of modulator 95 is supplied to combiner 96 which outputs a television signal for distribution over distribution system 98 to both in-band subscriber terminal units 99a and out-of-band subscriber terminal units 99b. Data from scrambler 94 can also be provided to data inserter 97 for the transmission of in-band data on non-scrambled channels.

Figure 8:
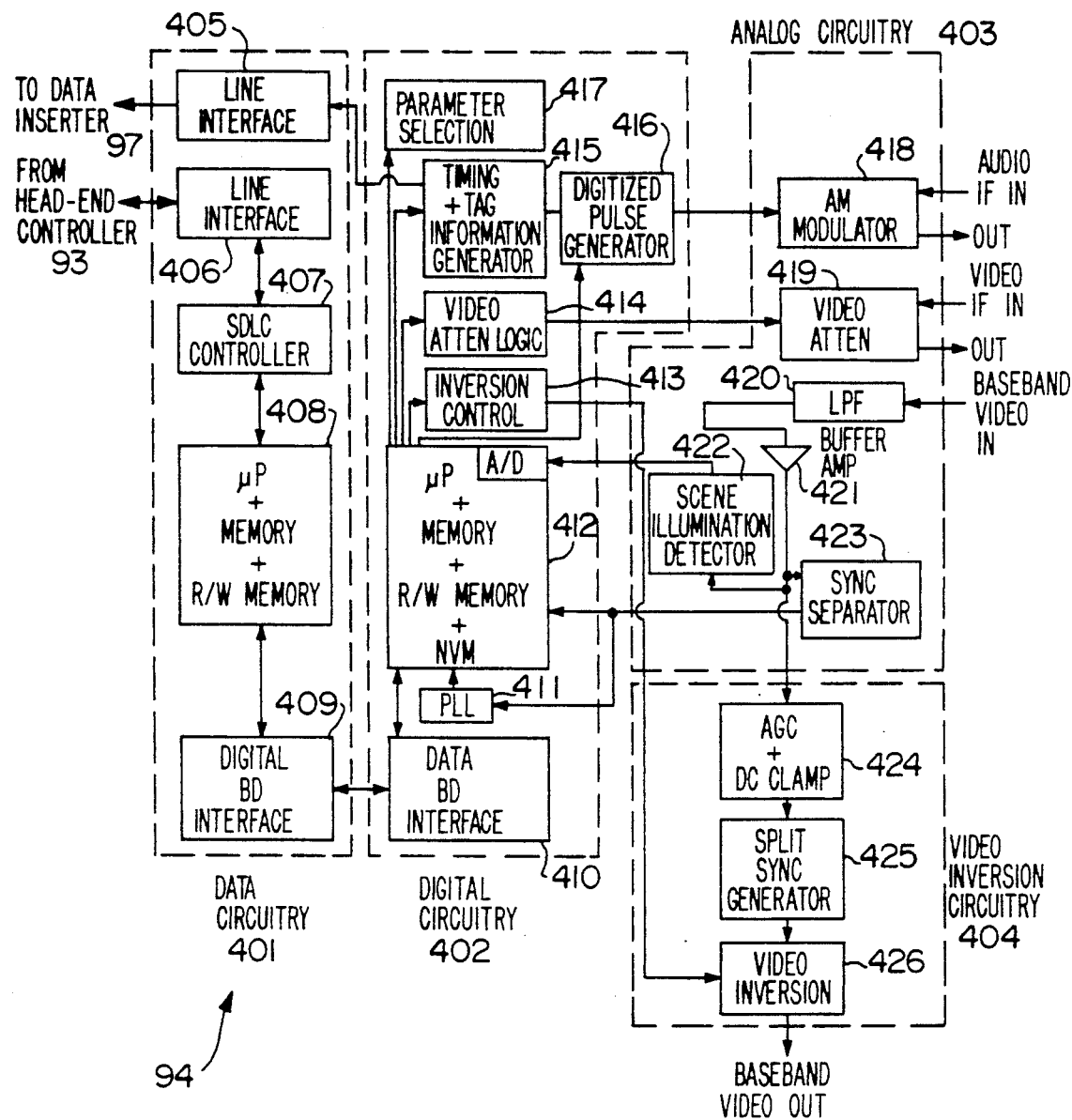
FIG. 8 is a block diagram of a scrambler incorporating the pulse generator of the present invention.

FIG. 8 is a block diagram of scrambler 94 in which the present invention may be implemented. Scrambler 94 includes data circuitry 401, digital circuitry 402, analog circuitry 403, and video inversion circuitry 404. Data circuitry 401 includes line interfaces 405 and 406, synchronous data link control (SDLC) 407, microprocessor 408, and digital circuit interface 409. SDLC 407 controls communication via line interface 406 between scrambler 94 and headend controller 93. Microprocessor 408 receives and processes information from SDLC 407. Interface circuit 409 interfaces the data circuitry 401 to the digital circuitry 402.

Digital circuitry 402 includes interface circuit 410, phase locked loop 411, microprocessor 412, inversion control circuit 413, video attenuation logic 414, timing and tag information generator 415, pulse generator 416, and parameter selection circuit 417. Interface circuit 410 interfaces digital circuitry 402 with data circuitry 401. Microprocessor 412 extracts data from data circuitry 401 and controls scrambling modes of the system. Pulse generator 416 generates the specific pulses placed on the sound carrier via the analog circuitry under the control of microprocessor 412. These pulses represent information including descrambling information. Timing and tag information generator 415 is an interface between microprocessor 412 and pulse generator 416 and converts signals from the microprocessor to signals suitable for input to pulse generator 416. Microprocessor 412 is also coupled to parameter selection circuitry 417 which may be a front panel display and keyboard which permits an operator to select various modes of operation, e.g., scrambling.

Analog circuitry 403 includes AM modulator 418, video attenuation circuitry 419, low pass filter 420, buffer amplifier 421, scene illumination detector 422, and synchronization separator 423. AM modulator 418 modulates the pulses from pulse generator 416 onto an audio IF signal from modulator 95 and outputs the modulated signal to modulator 95. Video attenuation circuitry 419 selectively provides sync suppression type scrambling and attenuates a video IF signal from modulator 95 under the control of video attenuation logic 414.

Baseband video input is filtered with low pass filter 420 which may be a sharp cut-off phase equalized low pass filter. Low pass filter 420 removes high frequency noise that can interfere with the baseband video. After filtering, the video is amplified back to its original level by video amplifier 421. Sync separator 423 extracts synchronization information which is then sent to microprocessor 412 to provide timing information such as composite and vertical sync and odd/even field indication. Scene illumination detector 422 determines the average luminance level of a scene, which level is supplied to an A/D converter of microprocessor 412. Microprocessor 412 uses this luminance information to detect scene changes in order to determine when scrambling modes may be optimally changed. The composite synchronization signal is supplied to the input of phase locked loop (PLL) 411. Phase locked loop 411 locks the system clock to the line rate.

The baseband video signal from amplifier 421 is also supplied to video inversion circuitry 404. Video inversion circuitry 404 includes automatic gain control (AGC) and DC clamping circuitry 424, split sync generator 425, and video inversion circuit 426. The AGC of circuit 424 adjusts the incoming signal to a predetermined value such as 1 V peak to peak. The DC clamping of circuitry 424 forces the bottom of the sync tip to be at ground. The details of split sync circuitry is discussed in commonly assigned U.S. Pat. No. 4,924,498, incorporated herein by reference. The output of split synchronization circuitry 425 is supplied to inverting circuitry 426 for inverting the baseband video about an inversion axis. Inversion is controlled in accordance with signals from inversion control circuit 413.

Figure 9:
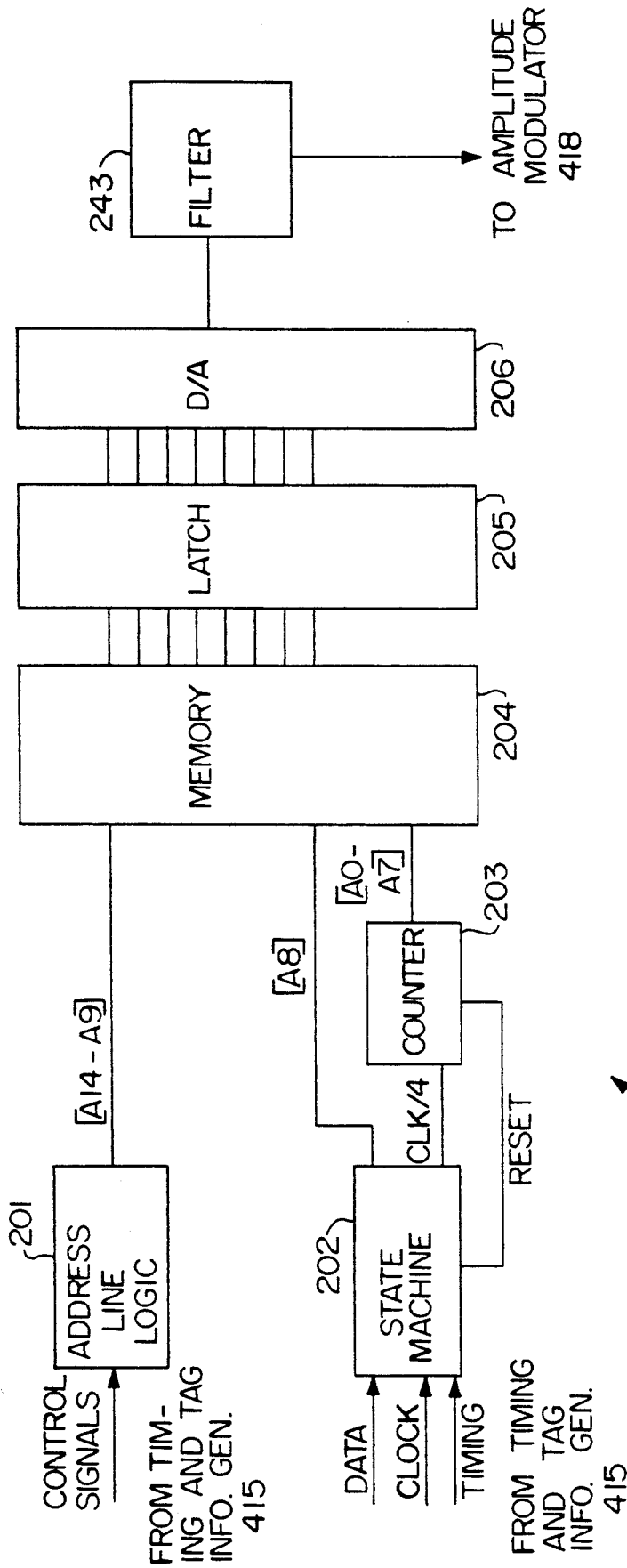
FIG. 9 is a block diagram of a pulse generator incorporated in the scrambler of FIG. 8.

FIG. 9 illustrates a block schematic diagram of pulse generator 416. Microprocessor 412 on the digital board supplies control signals via timing and tag information generator 415 to address line logic 201. The control signals from the microprocessor may correspond to data representing descrambling information required by a descrambler to recover a viewable picture. Other types of data may be transmitted. Address line logic 201 uses these inputs to select one pair of waveshapes from the selected bank of waveshapes by generating control signals for address lines A9, A10, A11, A12, A13, and A14. Address line logic 201 may, for example, be a PALCE16V8 available from Advanced Micro Devices. State machine 202 receives a 14.32 MHz clock signal, a data signal and a timing signal from microprocessor 412 via timing and tag information generator. The timing signal is indicative of the line rate $f_H$ to control timing. State machine 202 divides the incoming 14.32 MHz clock by four to provide a 3.58 MHz clock for clocking counter 203. State machine 202 also receives a reset signal from counter 203 to reset the state machine for the vertical interval. A reset mechanism is also provided for resetting the counter prior to each line of video to allow for a change in input from the microprocessor. Finally, in accordance with a data signal from microprocessor 412, state machine, 202 outputs a signal for controlling address line A8. This signal is used to select one of the selected pair of waveshapes and thus determines whether data is present on a given line. State machine 202 may be a PALCE16V8 from Advanced Micro Devices. Although two programmable array logics are utilized in the implementation of FIG. 9, a single PAL may be used.

Counter 203 receives a 3.58 MHz clock signal from state machine 202 and sequentially increments the address signals on address lines A0-A7 at each clock pulse. Counter 203 is an eight bit counter and thus would normally reset after 11111111. However, since 228 clocks of the 3.58 MHz clock signal correspond to one video line, counter 203 is reset after 228 clocks. The ripple carry output of counter is supplied to state machine 202 to indicate the beginning of the vertical interval. Counter 203 may be a SN74HC590A available from Texas Instruments.

The address information on lines A0-A14 is supplied to a memory 204 such as an EPROM. Memory 204 may be an AM27C256 available from Advanced Micro Devices. In accordance with the address information on lines A0-A14, memory 204 outputs a digital signal corresponding to the amplitude stored in memory at that address. As counter 203 increments the address signals on lines A0-A7, the stored waveshape is read out from memory 204. The output of the memory is latched by a latch 205 and then supplied to a digital to analog (D/A) converter 206 for converting the digital signal read from memory 204 to an analog signal for modulation onto the sound carrier. The output of D/A converter 205 may be an analog signal having an amplitude varying between 0 and +5 volts. The output of the D/A converter is filtered by filter 243 to remove clock noise. The output of filter 243 is supplied to amplitude modulator 418.

As set forth above, wave shapes may be selected on a line by line basis. That is, the signals on address lines A8, A9, A10, A11, A12, A13, and A14 may be updated every line. Accordingly, in an NTSC system memory 204 preferably stores waveshapes corresponding to 63.5 microsecond intervals, which waveshapes are selected at a frequency of 15.734 kilohertz. It will be readily appreciated that waveshapes corresponding to the line rates of other television systems may be stored in memory 204. It is desirable to intelligently store the waveshapes to minimize number of address lines which must be controlled by the microprocessor to select a waveshape each line time. By storing the waveshapes most frequently utilized by the scrambler of a particular channel in the same bank of eight of waveshapes, the microprocessor generally need only control at most three address lines on a line by line basis and thus fewer interruptions of the microprocessor are required to update the waveshape for the current line. However, the invention is not limited in this respect. For example, the microprocessor may be responsive to a user supplied signal in order to change select a different bank of waveshapes. Further, the waveshapes may be selected at intervals greater or less than the line rate, such as twice the line rate or half the line rate.

Storing pulses which are read out of memory for modulation onto a carrier or subcarrier of a television signal provide the opportunity to construct pulses particularly suited to achieve specific objectives. A first example is discussed above. A sine squared pulse may be stored in order to eliminate interference in a second channel caused by amplitude modulation of the audio subcarrier. A second example is also discussed above in which waveshapes have different pulse widths and amplitudes may be stored to eliminate the need for a variety of analog filter circuits and complicated timing control for selectively switching between the outputs of these filter circuits at precise times.

Figure 10:
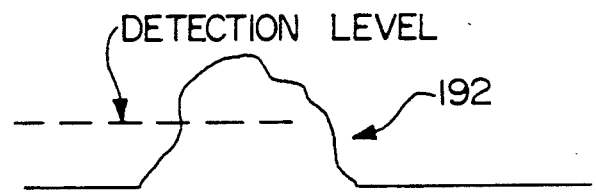
FIG. 10 illustrates an information waveshape having a slope which is substantially maximized at a detection level.

Pulses having specific shapes may be stored in memory. In a descrambler, for example, detection of the leading edge of a pulse is important for recovering a scrambled signal. Accordingly, it is desirable that the pulse have a sharp rising edge. A sharp rising edge, for example, reduces the effect of noise riding on the signal at the detection point which could result in either an early or a late detection of the pulse. Prior methods of increasing the slope of the rising edges of pulses resulted in signals resembling square waves and generated the interference problems discussed above. In accordance with the present invention, a pulse 192 may be stored in which the slope of the rising pulse edge is maximized at the detection point as shown in FIG. 10. Although this results in a lower slope at some other pulse portion, this does not affect the transmitted information which is determined at the rising pulse edge. It is noted that some harmonic energy may be added, but may be tolerable for a given application and is less than the amount of energy which would be added by changing the whole pulse shape.

Figure 11B:
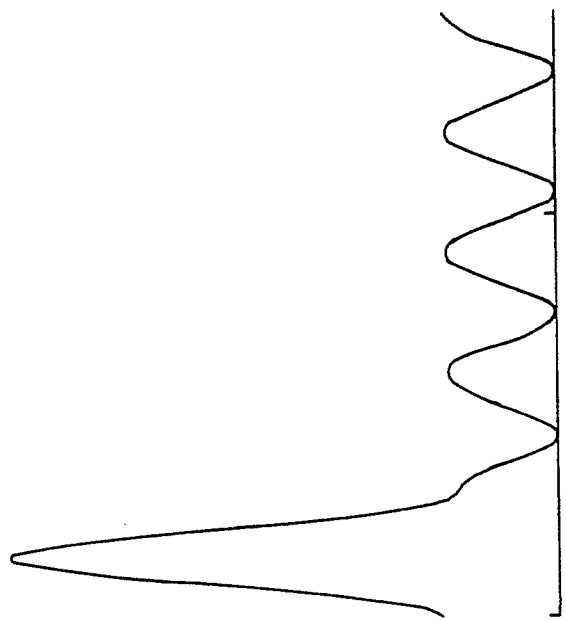
FIGS. 11A and 11B respectively illustrate a timing pulse and a timing pulse having a fifth harmonic removed.
Figure 11A:
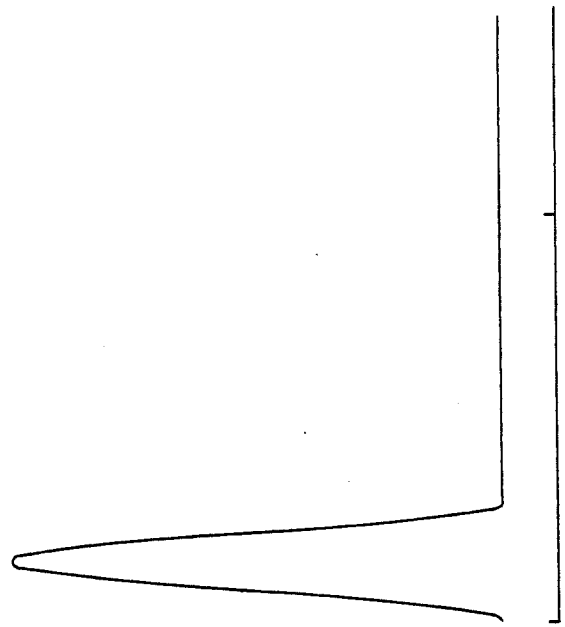

In another implementation, stored waveshapes may be used to reduce the problem of AM to FM conversion of the fifth harmonic of the pulse modulated onto the sound carrier at line frequency $f_H$ with respect to the second audio program subcarrier. In accordance with the digital storage of wave shapes as in the present invention, wave shapes may be stored for modulating the sound carrier with a particular harmonic or harmonics removed. It is also possible to not only remove harmonics, but to alter the amplitude and phase of any individual harmonic or several harmonics. Then, this new shape can be stored digitally in the time domain and modulated onto the audio carrier resulting in removal of the distortion or detection problem mentioned above. FIG. 11A shows a waveshape for amplitude modulating the sound carrier. As noted above, the fifth fundamental harmonic of the pulses modulated onto the sound carrier at line rate is the location of the subcarrier of second audio program in NTSC. Thus, modulating the sound carrier with pulses at the line rate adds energy at the SAP subcarrier frequency. Accordingly, FIG. 11B illustrates the same waveshape as that of FIG. 11A, but having the fifth harmonic removed. The removal of the fifth harmonic removes the energy contribution of the pulse modulated onto the sound carrier to the SAP frequency.

The present invention is not limited to the removal of a single harmonic. A number of harmonics may be removed. Further, the amplitude of any given harmonic may be increased or decreased rather than removed. Additionally, the phase of any harmonic may be changed. Appropriate variation of the amplitude and phase can, for example, compensate for filtering which may occur downline that would otherwise distort a desired output pulse. An illustrative example relates to the NICAM digital audio transmission system. FIG. 12 is a table illustrating the relationship between the monosound carrier and the NICAM sound carrier in PAL-I and PAL B&G specifications. In NICAM, a new carrier ("the NICAM carrier") is added near the top of the channel, and is QPSK modulated with digital information. The conventional FM sound channel remains, and is used to transmit the sum signal for use by non-NICAM equipped TV sets. Two baseband audio channels may be transmitted on the NICAM carrier. Thus, it can be used for stereo independent of the main sound carrier. The two channels may be reassigned to carry two difference languages, or one or both may be assigned to carry data.

Figure 13:
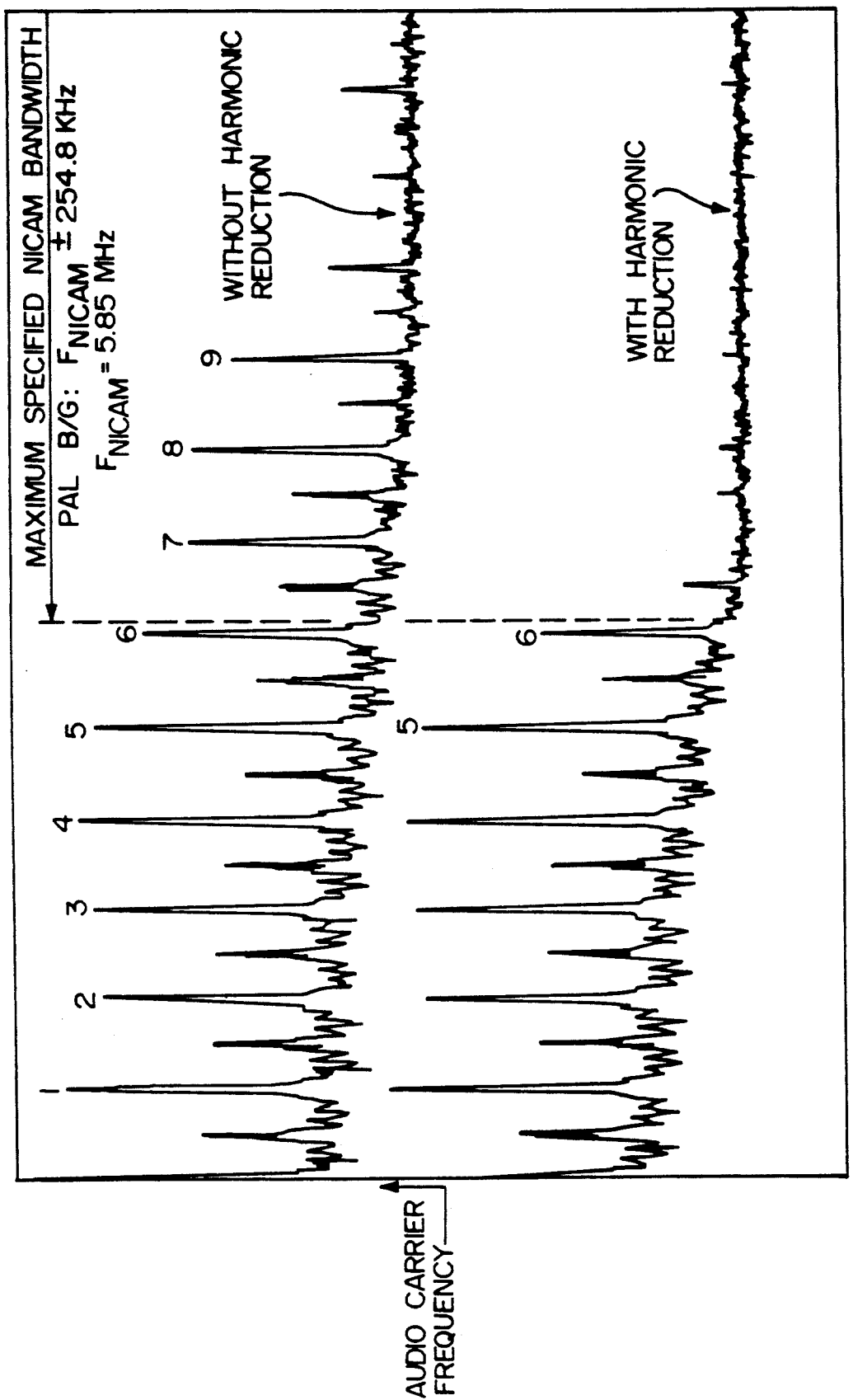
FIG. 13 illustrates relationship between main sound carrier and NICAM carrier.

Because of the close spacing of the NICAM carrier and the main sound carrier in the PAL B/G system, interference of NICAM carrier with the main sound carrier and interference with NICAM carrier by the main sound carrier may result. FIG. 13 illustrates the relationship of the NICAM bandwidth and the main sound carrier spectrum. As can be seen, removal of harmonics greater than the sixth harmonic of the main audio carrier minimizes the contribution of the main sound carrier to interference with NICAM. In practice, the sixth harmonic is also preferably removed. However, energy from the NICAM carrier spills over into remaining harmonics. One way to remove this energy is to include a filter around the audio carrier in the terminal unit which takes out all the NICAM energy. However, such an analog filter changes the amplitude and phase of the remaining harmonics of the main sound carrier. Thus, the amplitude of some harmonics may be increased while the amplitude of others are decreased. In accordance with the present invention, the effect of the filter on each harmonic is determined. Then, precompensation for these effects is provided for the harmonics. That is, the amplitude and phase of the remaining harmonics may be adjusted in a linear or non-linear manner (or both) to compensate for the effects of the filter.

Figure 14:
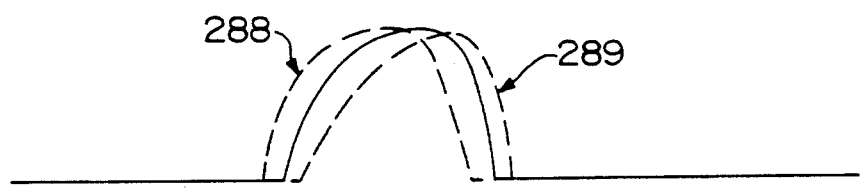
FIG. 14 illustrates information waveshapes which compensate for Gibbs ringing.

A further benefit of the present invention relates to compensation for the removal of harmonics. When harmonics are removed, Gibbs ringing occurs. Gibbs ringing is a well-known effect and can cause an apparent shifting in the time of a pulse position. Gibbs ringing caused by the removal of harmonics of pulses, for example, can lead to shifts in timing information. Since data pulses are not present on all lines, this shift varies from line to line. Accordingly, there is a need to know whether a data pulse was present on a previous line. The next timing pulse may then be adjusted in time to compensate for the shift caused by the presence of the data pulse. If a data pulse having harmonics removed is present on previous line, a waveshape with timing pulse shifted to compensate for the Gibbs ringing is selected for the next line. In accordance with the invention, 288 and 289 waveshapes are stored to compensate for a shift in timing pulses as shown in FIG. 14. The shifts are exaggerated and shown in superposition for ease in illustration.

The generation of specific waveshapes is carried out using Fourier transformations. If the function y(t) is periodic, with a time period $T = 1/f_o$ and, then it may be written in terms of the fundamental frequency $f_o$ and its harmonics $nf_o$ as $$y(t) = a_o + \sum_n a_n \cos(2\pi n f_o t) + \sum_n b_n \sin(2\pi n f_o t)$$

where $$a_o = \frac{1}{T} \int_o^T y(t)dt,$$

$$a_n = \frac{2}{T} \int_o^T y(t)\cos(2\pi n f_o t)dt$$

-continued
$$b_n = \frac{2}{T} \int_o^T y(t)\sin(2\pi n f_o t)dt$$

Figure 15:
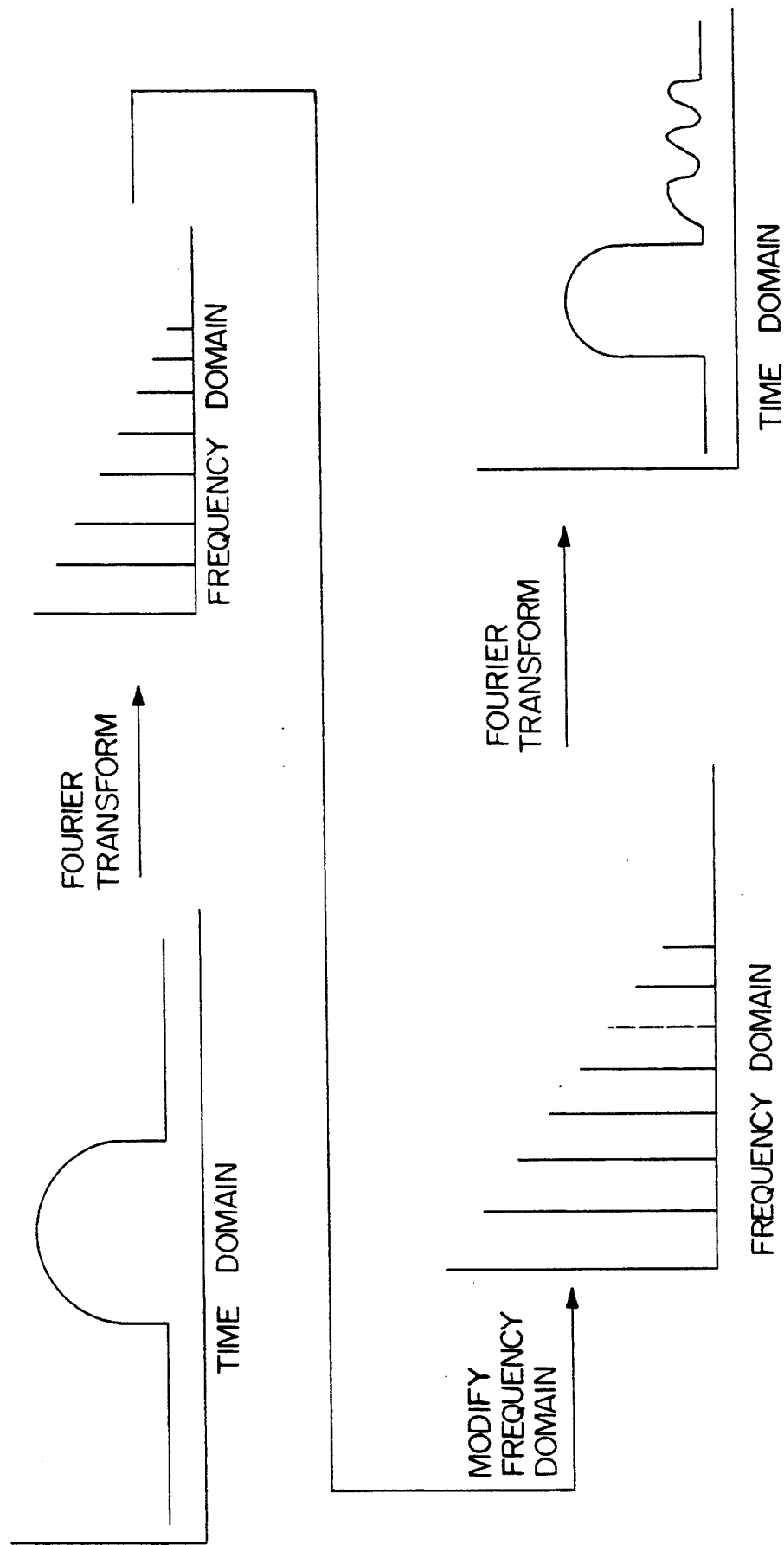
FIG. 15 is a diagram illustrating a method of generating pulses for storing in memory.

The generation of pulses to be stored in memory involves a series of conversions between the time domain and the frequency domain using Fourier transformations as illustrated with respect to FIG. 15. A waveshape is transformed from the time domain to the frequency domain, thereby yielding certain phases and amplitudes of each harmonic. The waveshape may then be modified in this frequency domain representation, e.g., removing the fifth harmonic, varying the amplitude and phase of harmonics. The resulting frequency domain representation may then be converted back to the time domain. The effect of the modified pulse on data transmission, e.g., interference with adjacent channels or with the SAP carrier, may then be determined. Based on these observations, other changes may be made in the frequency domain and their effects observed. This process is continued until a suitable waveshape is generated. The amplitude values of the suitable waveshape are generated. These amplitude values are then assembled as hexadecimal values which are stored in the EPROM in a manner well known in the art.

Accordingly, to remove the fifth harmonic in order to reduce the contribution of energy of a pulse modulated onto the sound carrier to the SAP frequency in an NTSC system, a representation of a waveshape is transformed from a time domain representation to a frequency domain representation. The fifth harmonic of the resulting frequency representation is minimized or eliminated. The representation of the waveshape is transformed from the frequency domain representation back to the time domain representation and stored as a sequence of addressable values representing the amplitude of the waveshape as a function of time as discussed above.

In order to precompensate a pulse for a filtering of a carrier of a television distribution network on which the pulse is modulated, a representation of a waveshape is transformed from a time domain representation to a frequency domain representation. The phase or the amplitude or both of the harmonics of the frequency domain representation of the waveshape are adjusted. The representation of the waveshape is transformed from the frequency domain representation back to the time domain representation. The resultant waveshape is modulated onto the carrier and the carrier is supplied to the filter. The actual filter output is compared with a desired filter output and the previous steps are repeated until a waveshape is generated for which the actual filter output substantially corresponds to the desired filter output. The time domain representation of the thus generated waveshape is stored as a sequence of addressable values representing the amplitude of the waveshape as a function of time in the manner discussed above.

In order to reduce the effect of signal noise on a detection of a pulse modulated onto a carrier of a television distribution network, a representation of a waveshape is transformed from a time domain representation to a frequency domain representation. The phase or the amplitude or both of the harmonics of the frequency domain representation of the waveshape are adjusted. The representation of the waveshape is transformed from the frequency domain representation back to the time domain representation and a slope of a resultant waveshape at a detection level of the waveshape is determined. These steps are repeated until a waveshape is generated having a slope substantially maximized at the detection level. The time domain representation of the thus generated waveshape is stored as a sequence of addressable values representing the amplitude of the waveshape as a function of time in the manner set forth above.

Variations and modifications in the herein described methods and systems, within the scope of the invention, will undoubtedly suggest themselves to those skilled in the art. Accordingly, the foregoing description should be taken as illustrative and not in a limiting sense.

We claim:

1. A pulse generator for generating pulses for modulation onto a carrier signal of a television signal distribution system, comprising:
   a memory for storing one or more waveshapes defined as sequence of addressable values representing the amplitude of the waveshape as a function of time;
   a selecting circuit for selecting one of the waveshapes from said memory;
   a counting circuit responsive to a clock signal for generating address signals for sequentially reading the amplitude values corresponding to the selected waveshape from said memory; and
   a digital to analog converter for converting the amplitude values sequentially read from said memory to an analog pulse for modulation onto the carrier.

2. The pulse generator according to claim 1, further comprising:
   a filter coupled to said digital to analog converter for removing clock noise from the analog pulse.

3. The pulse generator according to claim 1, wherein said memory stores waveshapes corresponding to a line period.

4. A method for generating pulses for modulation onto a carrier signal of a television signal distribution system, the method comprising the steps of:
   storing one or more waveshapes defined as sequence of addressable values representing the amplitude of the waveshape as a function of time;
   selecting one of the waveshapes from said memory;
   generating address signals for sequentially reading the amplitude values corresponding to the selected waveshape from said memory; and
   converting the amplitude values sequentially read from said memory to an analog pulse for modulation onto the carrier.

5. The method according to claim 4, further comprising the step of:
   filtering the analog pulse to remove clock noise.

6. A method of reducing interference to a first carrier of a first predetermined frequency due to modulating a carrier of a television distribution system with pulses at a second predetermined frequency having a harmonic substantially equal to the first predetermined frequency, the method comprising the steps of:
   transforming a representation of a waveshape from a time domain representation to a frequency domain representation including the harmonic substantially equal to the first predetermined frequency;
   minimizing the harmonic of the waveshapes substantially equal to the first predetermined frequency;
   transforming the representation of the waveshape from the frequency domain representation to the time domain representation;
   storing the time domain representation of the waveshape as a sequence of addressable values representing the amplitude of the waveshape as a function of time;
   generating address signals for sequentially reading the amplitude values corresponding to the waveshape at a selected time;
   converting the amplitude values to form an analog pulse; and
   modulating the analog pulse onto the carrier of a television distribution system.

7. A method of precompensating a pulse for a filtering of a carrier of a television distribution network on which the pulse is modulated, the method comprising the steps of:
   (a) transforming a representation of a waveshape from a time domain representation to a frequency domain representation;
   (b) adjusting the phase or the amplitude or both of the harmonics of the frequency domain representation of the waveshape;
   (c) transforming the representation of the waveshape from the frequency domain representation to the time domain representation;
   (d) modulating the resultant waveshape onto the carrier;
   (e) supplying the carrier to said filter;
   (f) comparing an actual filter output with a desired filter output;
   (g) repeating steps (a)–(f) until a waveshape is generated for which the actual filter output substantially corresponds to the desired filter output;
   (h) storing the time domain representation of the generated waveshape as a sequence of addressable values representing the amplitude of the waveshape as a function of time;
   (i) generating address signals for sequentially reading the amplitude values corresponding to the waveshape at a selected time;
   (j) converting the amplitude values to form an analog pulse; and
   (k) modulating the analog pulse onto the carrier of a television distribution system.

8. A method of reducing the effect of signal noise on a detection of a pulse modulated onto a carrier of a television distribution network, the method comprising the steps of:
   (a) transforming a representation of a waveshape from a time domain representation to a frequency domain representation;
   (b) adjusting the phase or the amplitude or both of the harmonics of the frequency domain representation of the waveshape;
   (c) transforming the representation of the waveshape from the frequency domain representation to the time domain representation;
   (d) determining a slope of a resultant waveshape at a detection level of said waveshape;
   (e) repeating steps (a)–(d) until a waveshape is generated having a slope substantially maximized at the detection level;
   (f) storing the time domain representation of the generated waveshape as a sequence of addressable values representing the amplitude of the pulse as a function of time;
   (g) generating address signals for sequentially reading the amplitude values corresponding to the waveshape at a selected time;
   (h) converting the amplitude values to form an analog pulse; and
   (i) modulating the analog pulse onto the carrier of a television distribution system.

* * * * *